Patented Mar. 14, 1944

2,343,997

UNITED STATES PATENT OFFICE 2,343,997

STABILIZED VINYL RESIN COATING

George M. Powell and William H. McKnight, Charleston, W. Va., assignors to Carbide and Carbon Chemicals Corporation, a corporation of New York No Drawing. Application January 31, 1942, Serial No. 429,112

10 Claims. (Cl. 260—21)

This invention pertains to coatings comprising artificial resins containing polymerized vinyl chloride, such as polymerized vinyl chloride itself and conjoint polymers of vinyl chloride with vinyl esters of aliphatic acids, and has for its object the stabilization of such coatings against thermal decomposition.

The tendency of artificial resins containing polymerized vinyl chloride to discolor and darken on intense heating is quite commonly encountered. This effect is accentuated when coatings containing these resins are baked on metallic surfaces, such as those of iron, tin-plate and zinc, in order to increase the adhesion of the coating to the metal surface. While it is known that certain pigments of mild basicity, such as lead oxide, when included in such coatings, will markedly inhibit the deterioration of the resin on heating, these materials, being pigments, are obviously not satisfactory where clear or translucent coatings are desired. Accordingly, considerable attention has been directed to the development of stabilizing ingredients which are not pigments, and basic amines and basic resins containing amino nitrogen have been suggested for this purpose. However, amino compounds, in general, such as triethanolamine, and amido compounds, such as urea, dicyandiamide and melamine are not satisfactory because they promote the development of a yellow color in the resin.

According to this invention, a coating comprising an artificial resin containing polymerized vinyl chloride is provided which is without a yellow or other color and which does not discolor on prolonged heating. This is effected by incorporating in the resinous coating a stabilizing resin derived by condensing formaldehyde with an amide of the type represented by urea and melamine, along with an adjuvant material. The stabilizing resins of this invention do not contain basic amino nitrogen, and in the small proportions necessary for stabilization they are substantially compatible with the artificial resins containing polymerized vinyl chloride.

The resinous condensation products of formalde with urea or melamine are well known and are widely used in surface coatings, particularly where a heat-hardenable coating is required which converts rapidly at relatively low temperatures. Such resins are frequently manufactured in the presence of aliphatic alcohols, such as butanol, octanol-2, or 2-ethylhexanol, which become combined chemically in the resin, and even after baking remain in the film to a certain extent. Resins of this alcohol modified type are preferred in the practice of the present invention because of their greater compatibility with solutions of the vinyl chloride resins in the customary lacquer solvents and diluents.

Many different types of urea-formaldehyde resins and melamine-formaldehyde resins have been tested and all have been found to be effective heat stabilizers for coatings of artificial resins containing polymerized vinyl chloride, but, to a greater or less degree, all are subject to a distinct disadvantage in the absence of an adjuvant material according to this invention. This disadvantage is that, on baking a vinyl chloride resin coating containing such a stabilizing resin alone, a number of minute reticular cracks or "checks" appear in the film, which render it unattractive in appearance and impair its durability in service. The reasons for the development of this "checking" condition are obscure, since neither the vinyl chloride resin nor the stabilizing resin exhibits this defect on baking in the absence of the other. Moreover, the "checking" condition is not prevented by the addition of plasticizers for the vinyl chloride resin as might be expected. It has been found by test that the tendency towards checking of coatings containing vinyl resins with stabilizing amide resins of the type referred to can be prevented by adding a small amount of an adjuvant material of the class of vegetable oils, vegetable oil modified alkyd resins and unmodified alkyd resins.

The adjuvant material does not, in itself, have an appreciable stabilizing action on the vinyl resin, and its ability to prevent checking of the stabilized coating is surprising in view of the tendency towards stratification that is sometimes observed on baking coatings containing vinyl chloride resins and alkyd resins.

The following are examples of suitable adjuvant vegetable oils, which may be employed in the raw, heat-bodied, or blown condition.

| Non-drying vegetable oils | Semi-drying vegetable oils | Drying vegetable oils |
|---|---|---|
| Acorn oil | Beechnut oil | Candlenut oil |
| Almond oil | Brazilnut oil | Cedar nut oil |
| Apricot kernel oil | Cameline oil | China-wood (tung) oil |
| Calophyllum oil | Corn oil | Fir-seed oil |
| Canari oil | Cottonseed oil | Linseed oil |
| Castor oil | Croton oil | Madia oil |
| Elderberry oil | Jamba oil | Manihot oil |
| Elazy oil | Kapok oil | Niger seed oil |
| Grapeseed oil | Mustard oil | Oiticica oil |
| Hazelnut oil | Pumpkin seed oil | Perilla oil |
| Koëme oil | Radish seed oil | Poppy seed oil |
| Olive oil | Rape oil | Saffron oil |
| Owala oil | Sesame oil | Sunflower oil |
| Plum kernel oil | Soya bean oil | Walnut oil |
| Rice oil | Wheat oil | |
| Senega root oil | | |

An example of a non-drying alkyd resin is a castor oil modified glycerol-phthalic anhydride resin; suitable semi-drying alkyd resins include soya bean oil modified glycerol-phthalic anhydride resin; and examples of drying alkyd resins comprise resins resulting from the condensation of glycerol, phthalic anhydride, and linseed oil, from the condensation of glycerol, succinic anhydride and tung oil, and from the condensation of mannitol, maleic anhydride and perilla oil. Other non-drying, semi-drying, or drying vegetable oils may be substituted for those mentioned above in forming the modified alkyd resins, and other polyhydric alcohols, such as ethylene glycol, diethylene glycol, tetraethylene glycol, propylene glycol, dipropylene glycol, polyglycerol and sorbitol may be employed in forming either the modified or unmodified alkyd resins. Moreover, other dibasic acids, such as oxalic, malonic, fumaric, tetrahydrophthalic, endo-methylene tetrahydrophthalic and endo-methylene hexadrophthalic acid, may be substituted for the dibasic acids shown above in forming either the modified or unimodified alkyd resins.

Of the adjuvant materials mentioned above, it is preferred to use non-drying vegetable oils and non-drying vegetable oil modified alkyd resins.

The adjuvant material is not limited to substances that are completely compatible with artificial resins containing vinyl chloride, and "checking" has been prevented by the addition of either a glyceryl phthalate resin modified by linseed oil fatty acids which latter resin was completely compatible in the dried film with a conjoint polymer of vinyl chloride and vinyl acetate containing a stabilizing resin, or by a similar resin which was not completely compatible under the same conditions. However, extremely incompatible substances are less useful than the more compatible types, and, in any event, no more of the adjuvant material should be used than is necessary to prevent "checking."

In forming the coatings, a lacquer is made of the conjoint polymer resin, stabilizing urea-formaldehyde or melamine-formaldehyde resin and adjuvant material and applied in any suitable manner to the surface to be coated. Usually the coating is baked for about 10 to 30 minutes at a temperature of about 325° to 375° F. in order to effect adequate bonding of the coating film to the underlying surface. The baking operation may also serve to convert the stabilizing resin and the adjuvant alkyd resin to the insoluble form, but this effect is not essential to the practice of the invention. Suitable solvents for use in forming the lacquer include ketones, such as methyl ethyl ketone, methyl isobutyl ketone, cyclohexanone, and isophorone, along with the usual diluents, such as toluene and xylene. It has been found that the addition to the lacquer of an alkylene glycol monoether, such as ethylene glycol monomethyl ether, ethylene glycol monoethyl ether, ethylene glycol monobutyl ether, diethylene glycol monomethyl ether, and ethylene glycol monophenyl or monobenzyl ether, will in most cases eliminate any turbidity of the lacquer resulting from incomplete compatibility of the ingredients, and a coating of smoother appearance will result. The inclusion of a small amount of an alkylene oxide, such as propylene oxide, is also a desirable precautionary measure in order to neutralize any traces of acid present, which might otherwise affect the ureaformaldehyde or melamine-formaldehyde resin.

The amount of stabilizing resin required may vary from 0.5 to 10 parts per 100 parts of the vinyl chloride resin, although somewhat higher and lower amounts may be used. The amount of vegetable oil, vegetable oil modified alkyd resin, or unmodified alkyd resin to be employed desirably does not exceed that required to prevent "checking," which amount is usually from 0.2 to 6 parts of the adjuvant per 100 parts of the vinyl chloride resin, depending on the stabilizing resin and adjuvant material used. In general, best results are obtained if the amount of adjuvant material is less than that of the stabilizing resin.

Conjoint polymers of vinyl chloride and vinyl aliphatic esters are preferred in the practice of the invention, and such resins may contain from 60 to 95% vinyl chloride, the remainder being substantially a vinyl ester of an aplhatic acid, such as acetic, propionic or butyric acid. The molecular weights of the conjoint polymer may vary from 5000 to 20,000 or higher, as determined by Staudinger's method.

The examples to follow illustrate the invention.

Example 1

A lacquer of the following composition was prepared:

| | Parts |
|---|---|
| Conjoint polymer of vinyl chloride and vinyl acetate | 20 |
| Urea-formaldehyde resin solution (25% solution in a mixture of ethylene glycol monoethyl ether, butanol and octanol) | 4 |
| Alkyd resin solution (60% solution of castor oil-glycerol-phthalic anhydride resin in xylene) | 1.0 |
| Propylene oxide | 0.5 |
| Ethylene glycol monomethyl ether | 4.5 |
| Methyl isobutyl ketone | 80 |
| Toluene | 80 |

A steel panel was cleaned with sandpaper, and one coat of the above lacquer was applied by spraying. After drying, the panel was baked at 350° F. for 30 minutes. An adherent coating, smooth and clear, was obtained which showed no evidence of discoloration or decomposition of the resin, and which showed no signs of checking.

In contrast, a film deposited on a steel panel from a lacquer of the same composition, but without the urea resin and the alkyd resin, became badly blackened and discolored on baking the panel at 350° F. for 6 minutes.

On the other hand, a film deposited from a lacquer of the same composition, but containing no alkyd resin, did not discolor on baking at 350° F. for 30 minutes, but the coating exhibited a prominent reticulated pattern of irregular "checks."

A film which was deposited from a lacquer of the same composition containing the alkyd resin, but no urea resin, was nearly as discolored on baking for 7 minutes at 350° F. as the film which contained neither alkyd resin or urea resin.

The urea-formaldehyde resin when applied alone to the steel panel and baked at 350° F. for 30 minutes did not exhibit any signs of "checking."

Example 2

A lacquer of the following composition was prepared:

| | Parts |
|---|---|
| Conjoint polymer of vinyl chloride and vinyl acetate | 20 |
| Urea-formaldehyde resin solution (25% solution in a mixture of ethylene glycol monoethyl ether, butanol and octanol) | 4 |
| Blown castor oil | 1 |
| Propylene oxide | 0.5 |
| Ethylene glycol monomethyl ether | 4.5 |
| Methyl isobutyl ketone | 80 |
| Toluene | 80 |

This lacquer was applied to a steel panel and the film was baked for 30 minutes at 350° F. A clear coating, tough and adherent, was obtained which showed no discoloration and which exhibited no indication of "checking."

Example 3

A lacquer of the following composition was prepared:

| | Parts |
|---|---|
| Conjoint polymer of vinyl chloride and vinyl acetate | 20 |
| Urea-formaldehyde resin solution (55% solution in butanol) | 2 |
| Alkyd resin solution (60% solution of castor oil-glycerol-phthalic anhydride resin in xylene) | 1 |
| Ethylene glycol monomethyl ether | 20 |
| Methyl isobutyl ketone | 65 |
| Toluene | 65 |

This lacquer was a clear homogeneous solution. It was applied by spraying to a clean black iron panel. After drying, the panel was baked for 15 minutes at 350° F. A clear, colorless and adherent coating on the panel was obtained which showed no signs of thermal decomposition. In contrast to this, a similar coating which did not contain the stabilizing resin or alkyd resin, decomposed and became blackened during baking for a 10 minute period at 350° F.

Example 4

A lacquer of the following composition was prepared:

| | Parts |
|---|---|
| Conjoint polymer of vinyl chloride and vinyl acetate | 20 |
| Melamine-formaldehyde resin | .134 |
| Alkyd resin (castor oil-glycerol-phthalic anhydride resin) | .066 |
| Methyl isobutyl ketone | 41 |
| Toluene | 41 |

Coatings were applied from this solution to black iron panels and dried. One of these panels was baked for 30 minutes at 325° F. and another was baked for 15 minutes at 350° F. In both cases, the resultant coating showed no signs of decomposition.

Example 5

A pigmented coating of the following composition was prepared:

| | Parts |
|---|---|
| Titanium dioxide | 12.2 |
| Conjoint polymer of vinyl chloride and vinyl acetate | 12.7 |
| Butyl phthalyl butyl glycollate | 1.3 |
| Meta-para tricresyl phosphate | 1 |
| Urea-formaldehyde resin solution (45% solution in mixture of butanol and 2-ethyl hexanol) | 0.55 |
| Blown castor oil | 0.25 |
| Isophorone | 29 |
| High-flash naphtha | 21.7 |
| Hydrogenated petroleum naphtha | 21.7 |

This pigmented composition is suitable for application by roller coating to articles made of tinplate, black iron or steel. On applying the composition to a steel panel and baking for 15 minutes at 340° to 350° F., a white, adherent and non-toxic coating of high gloss was obtained which showed no signs of thermal decomposition. The composition is suitable for use on metal caps and closures that are used in the packaging of food products.

Example 6

The following solution was prepared:

| | Parts |
|---|---|
| Conjoint polymer of vinyl chloride and vinyl acetate | 20 |
| Urea-formaldehyde-butanol resin | .67 |
| Castor oil-glycerol-phthalic anhydride resin | .333 |
| Methyl isobutyl ketone | 40 |
| Toluene | 40 |
| Ethylene glycol monomethyl ether | 8.3 |
| Butanol | 0.5 |
| Xylene | 0.2 |

This solution was applied by spraying to a clean black iron panel and the coating baked for 90 minutes at 350° F. A clear and adherent coating was obtained which showed no thermal decomposition despite the long heat treatment.

Example 7

A solution of the following composition was prepared:

| | Parts |
|---|---|
| Polyvinyl chloride | 10.0 |
| Urea-formaldehyde-octanol resin | 0.5 |
| Castor oil-glycerol-phthalic anhydride resin | 0.3 |
| Ethylene glycol monomethyl ether | 8.0 |
| Propylene oxide | 0.5 |
| Xylene | 0.2 |
| Cyclohexanone | 90.0 |
| Butanol | 0.25 |
| Octanol | 0.25 |

This solution was clear and homogeneous. It was applied by spraying to a clean steel panel, and the panel with its resultant coating was baked for 30 minutes at 350° F. At the end of this time, there was no indication of thermal decomposition of the resin or of "checking" of the film. On the other hand, a coating of polyvinyl chloride alone on steel became badly blackened after 10 minutes heating at 350° F.

The conjoint polymer resin employed in the Examples 1 to 6 above, contained about 87% vinyl chloride and had a molecular weight of about 10,000. It is apparent that the invention can be practiced with other resins containing polymerized vinyl chloride, such as conjoint polymers of vinyl chloride with acrylate esters, methacrylate esters, or vinylidene chloride. Polymerization products containing vinyl chloride which have been subjected to after-chlorination are also included with the scope of the invention. It is also contemplated that the compositions shown in the foregoing examples may be modified by the addition of other plasticizers, pigments, waxes, filling materials, natural resins, gums and the like, as is customary in the art.

We claim:

1. A coating composition stabilized against decomposition on heating, comprising an artificial resin containing polymerized vinyl chloride associated with from about 0.5 to about 10 parts of a stabilizing ingredient per 100 parts of the artificial resin, said stabilizing ingredient comprising a resin containing substantially no basic amino groups, resulting from the condensation of formaldehyde with an amide of the group consisting of urea and melamine, and from about 0.2 to about 6 parts of an adjuvant material per 100 parts of the artificial resin, said adjuvant material being adapted to prevent reticular formations in the coating on baking, and comprising one of the group consisting of vegetable oils, vegetable oil modified alkyd resins, and unmodified alkyd resins.

2. A coating composition stabilized against decomposition on heating, comprising a conjoint polymer of vinyl chloride with a vinyl ester of an aliphatic acid associated with from about 0.5 to about 10 parts of a stabilizing ingredient per 100 parts of the conjoint polymer, said stabilizing ingredient comprising a resin containing substantially no basic amino groups, resulting from the condensation of formaldehyde with an amide of the group consisting of urea and melamine, and from about 0.2 to about 6 parts of an adjuvant material per 100 parts of the conjoint polymer, said adjuvant material being adapted to prevent reticular formations in the coating on baking, and comprising one of the group consisting of vegetable oils, vegetable oil modified alkyd resins and unmodified alkyd resins.

3. A coating composition stabilized against decomposition on heating, comprising polyvinyl chloride associated with from about 0.5 to about 10 parts of a stabilizing ingredient per 100 parts of the polyvinyl chloride, said stabilizing ingredient comprising a resin containing substantially no basic amino groups, resulting from the condensation of formaldehyde with an amide of the group consisting of urea and melamine, and from about 0.2 to about 6 parts of an adjuvant material per 100 parts of the polyvinyl chloride, said adjuvant material being adapted to prevent reticular formations in the coating on baking, and comprising one of the group consisting of vegetable oils, vegetable oil modified alkyd resins and unmodified alkyd resins.

4. A coating composition stabilized against decomposition on heating in contact with metal surfaces, comprising a conjoint polymer of vinyl chloride with a vinyl ester of an aliphatic acid associated with from about 0.5 to about 10 parts of a stabilizing ingredient per 100 parts of the conjoint polymer, said stabilizing ingredient comprising a resin containing substantially no basic amino groups, resulting from the condensation of formaldehyde with urea, and from about 0.2 to about 6 parts of an adjuvant material per 100 parts of the conjoint polymer, said adjuvant material being adapted to prevent reticular formations in the coating on baking, and comprising castor oil.

5. A coating composition stabilized against decomposition on heating in contact with metal surfaces, comprising a conjoint polymer of vinyl chloride with a vinyl ester of an aliphatic acid associated with from about 0.5 to about 10 parts of a stabilizing ingredient per 100 parts of the conjoint polymer, said stabilizing ingredient comprising a resin containing substantially no basic amino groups, resulting from the condensation of formaldehyde with urea, and from about 0.2 to about 6 parts of an adjuvant material per 100 parts of the conjoint polymer, said adjuvant material being adapted to prevent reticular formations in the coating on baking, and comprising a castor oil modified glycerol-phthalic anhydride alkyd resin.

6. A coating composition stabilized against decomposition on heating in contact with metal surfaces, comprising a conjoint polymer of vinyl chloride with a vinyl ester of an aliphatic acid associated with from about 0.5 to about 10 parts of a stabilizing ingredient per 100 parts of the conjoint polymer, said stabilizing ingredient comprising a resin containing substantially no basic amino groups, resulting from the condensation of formaldehyde with melamine, and from about 0.2 to about 6 parts of an adjuvant material per 100 parts of the conjoint polymer, said adjuvant material being adapted to prevent reticular formations in the coating on baking, and comprising a castor oil modified glycerol-phthalic anhydride alkyd resin.

7. A coating composition stabilized against decomposition on heating in contact with a metal surface of the group consisting of iron, tin-plate and zinc, comprising a conjoint polymer of vinyl chloride with vinyl acetate associated with from 0.5 to 10 parts of a stabilizing ingredient per 100 parts of the conjoint polymer, said stabilizing ingredient comprising a resin containing substantially no basic amino groups, resulting from the condensation of formaldehyde with an amide of the group consisting of urea and melamine, and from 0.2 to 6 parts of an adjuvant material per 100 parts of said conjoint polymer, said adjuvant material being adapted to prevent reticular formations in the coating on baking, and comprising one of the group consisting of vegetable oils, vegetable oil modified alkyd resins, and unmodified alkyd resins.

8. A coating composition stabilized against decomposition on heating in contact with a metal surface of the group consisting of iron, tin-plate and zinc, comprising a conjoint polymer of vinyl chloride with vinyl acetate associated with from 0.5 to 10 parts of a stabilizing ingredient per 100 parts of the conjoint polymer, said stabilizing ingredient comprising a resin containing substantially no basic amino groups, resulting from the condensation of formaldehyde with an aliphatic alcohol and an amide of the group consisting of urea and melamine, and from 0.2 to 6 parts of an adjuvant material per 100 parts of said conjoint polymer, said adjuvant material being adapted to prevent reticular formations in the coating on baking, and comprising one of the group consisting of vegetable oils, vegetable oil modified alkyd resins, and unmodified alkyd resins.

9. A liquid coating composition adapted to deposit a film stabilized against decomposition on heating, comprising a solution, in an organic solvent mixture containing an alkylene glycol monoether, of a conjoint polymer of vinyl chloride with a vinyl ester of an aliphatic acid associated with from about 0.5 to about 10 parts of a stabilizing ingredient per 100 parts of the conjoint polymer, said stabilizing ingredient comprising a resin containing substantially no basic amino groups, resulting from the condensation of formaldehyde with an amide of the group consisting of urea and melamine, and from about 0.2 to about 6 parts of an adjuvant material per 100 parts of the conjoint polymer, said adjuvant material being adapted to prevent reticular formations in the coating on baking, and comprising one of the group consisting of vegetable oils, vegetable oil modified alkyd resins, and unmodified alkyd resins.

10. A liquid coating composition adapted to deposit a film stabilized against decomposition on heating, comprising a solution, in an organic solvent mixture containing ethylene glycol monomethyl ether, of a conjoint polymer of vinyl chloride with vinyl acetate associated with from about 0.5 to about 10 parts of a stabilizing ingredient per 100 parts of the conjoint polymer, said stabilizing ingredient comprising a resin containing substantially no basic amino groups, resulting from the condensation of formaldehyde with an amide of the group consisting of urea and melamine, and from about 0.2 to about 6 parts of an adjuvant material per 100 parts of the conjoint polymer, said adjuvant material being adapted to prevent reticular formations in the coating on baking, and comprising one of the group consisting of vegetable oils, vegetable oil modified alkyd resins, and unmodified alkyd resins.

GEORGE M. POWELL.
WILLIAM H. McKNIGHT.